United States Patent [19]

Aronson et al.

[11] Patent Number: 5,045,225
[45] Date of Patent: Sep. 3, 1991

[54] SELF HYDROPHOBING SILICONE/HYDROCARBON ANTIFOAM COMPOSITIONS

[75] Inventors: Michael P. Aronson, West Nyack, N.Y.; Samuel O. Lin, Paramus, N.J.; George A. Policello, Peekskill, N.Y.

[73] Assignee: Lever Brothers Co., Division of Conopco Inc., New York, N.Y.

[21] Appl. No.: 455,875

[22] Filed: Dec. 18, 1989

Related U.S. Application Data

[63] Continuation of Ser. No. 292,300, Dec. 30, 1988, abandoned.

[51] Int. Cl.$^5$ .......................... C11D 3/00; C11D 9/36
[52] U.S. Cl. .......................... 252/174.15; 252/174.19; 252/174.25; 252/321; 252/358; 252/DIG. 2
[58] Field of Search .................. 252/321, 358, 174.19, 252/174.13, 174.25

[56] References Cited

U.S. PATENT DOCUMENTS

| | | | |
|---|---|---|---|
| 3,032,577 | 5/1962 | Morehouse | 260/448.2 |
| 3,402,191 | 9/1968 | Morehouse | 260/448.2 |
| 3,544,498 | 12/1970 | Holdstock et al. | 524/588 |
| 3,560,401 | 2/1971 | O'Hara | 252/358 |
| 4,101,443 | 7/1978 | Rosen et al. | 252/358 |
| 4,264,465 | 4/1981 | Abel | 252/99 |
| 4,395,352 | 7/1983 | Kulkarni et al. | 252/321 |
| 4,430,235 | 2/1984 | Chu et al. | 252/49.6 |
| 4,443,359 | 4/1984 | Shimizu et al. | 252/358 |
| 4,450,152 | 5/1984 | Ona et al. | 424/70 |
| 4,507,455 | 3/1985 | Tangney et al. | 528/26 |
| 4,514,319 | 4/1985 | Kulkarni et al. | 252/321 |
| 4,541,936 | 9/1985 | Ona et al. | 252/8.6 |
| 4,584,125 | 4/1986 | Griswold et al. | 252/358 |
| 4,585,563 | 4/1986 | Busch et al. | 252/8.8 |
| 4,801,401 | 1/1989 | Schulz et al. | 252/358 |
| 4,820,308 | 4/1989 | Madrange et al. | 8/405 |

FOREIGN PATENT DOCUMENTS 1447254 8/1976 United Kingdom .

Primary Examiner—Paul Lieberman
Assistant Examiner—Kevin McCarthy
Attorney, Agent, or Firm—G. J. McGowan, Jr.

[57] ABSTRACT

An antifoam composition and laundry detergent formulation including it. The antifoam composition comprises a selected alkylaminosilicone, finely divided filler particles and a hydrocarbon carrier oil. Optional ingredients include oil/water surfactants and silicone oils. The alkylaminosilicone reduces the surface tension of the hydrocarbon oil and renders the formulation self-hydrophobing.

36 Claims, 1 Drawing Sheet

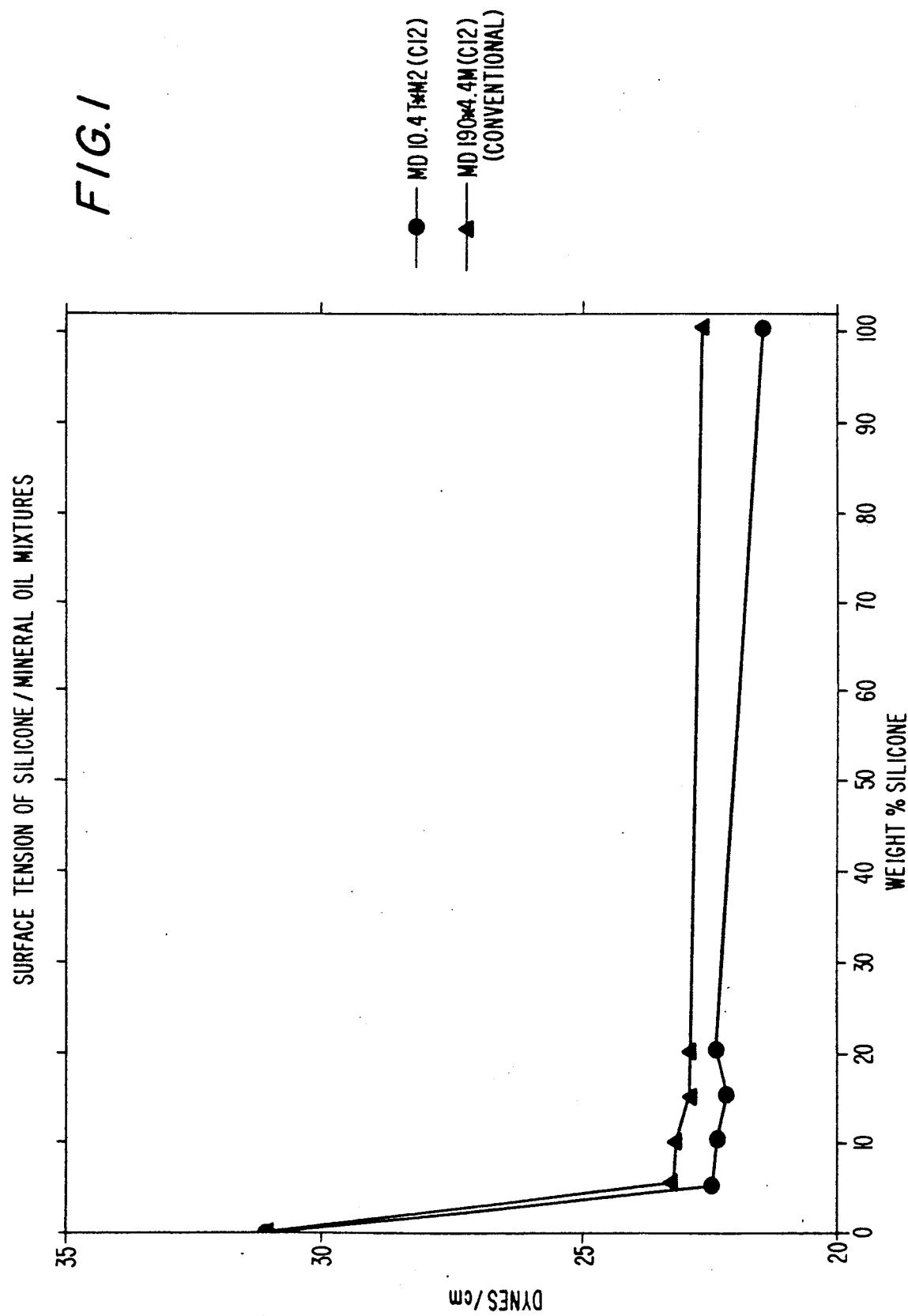

SELF HYDROPHOBING SILICONE/HYDROCARBON ANTIFOAM COMPOSITIONS

This is a continuation of Ser. No. 292,300, filed Dec. 30, 1988, now abandoned.

FIELD OF THE INVENTION

The application concerns silicone/hydrocarbon antifoam compositions containing specific aminoalkylsilicones.

BACKGROUND OF THE INVENTION

Antifoam agents (also known as defoamers) are used as processing aids for foam control, improving filtration, dewatering, washing, and drainage. Antifoams find use in the pulp and paper industry, the paint and latex industry, the textile industry, the fermentation industry, and the detergent industry.

The components of an antifoam composition are generally divided into five functional classifications: primary antifoam agent, secondary antifoam agent, a carrier, an emulsifier, and a stabilizing agent. However, the functions of the components sometimes overlap each other so that fewer components may be required. The primary antifoaming agents comprise highly insoluble particulate materials such as hydrophobic silicas, fatty amides, and fatty acids or esters. They are in most cases insoluble in the carrier. Secondary antifoaming agents modify the crystallinity, surface properties, solubility and roughness of the primary antifoaming agents. The carriers comprise the bulk of the antifoam formulation and include hydrocarbon oils, silicone oils, or water. Emulsifiers help the active antifoam agents to spread over foams whereas stabilizing agents prolong the shelf life of the antifoams, and comprise preservatives or cosolvents for the carriers and the actives.

In practice, the principal ingredients for most antifoams are hydrophobic particles and hydrophobic oils such as hydrocarbon oils and silicone oils. A representative formulation for hydrocarbon-based antifoam consists of 4 parts of stearic diamide of ethylene diamine, 1 part of Castrol motor oil, 3.5 parts of vinyl acetate-fumaric acid copolymer, 91.3 parts of paraffin oil, and 0.2 parts of silicone oil. On the other hand, a representative formulation of silicone-based antifoam consists of 2.7 parts of hydrophobically-modified silica, 87.3 parts of 10,000 cstks silicone oil, and 10 parts of polysiloxaneoxyalkylene block copolymer surfactant. Because of lower surface tension, the silicone antifoams tend to be more effective than the hydrocarbon antifoam; they are, however, more costly.

The mechanism of defoaming is not yet understood completely. This is particularly true in the case of antifoams utilizing hydrophobic oil and hydrophobic particles. However, in Chem. Eng. Prog. 63(9) (1967), Ross has proposed two simple mechanisms for antifoams which do not have hydrophobic particles. In the first mechanism, an antifoam droplet enters the film between two bubbles and spreads as a thick duplex film; the spreading action sets up tensions that mechanically break the foam. According to the second mechanism, the antifoam droplet enters the liquid film but only spreads to a limited extent, producing a mixed monolayer with the foam agent. If this mixed monolayer has poor coherence, the foam will be broken.

Kulkarni et al. have proposed in Ind. Eng. Chem. Fundam. 16, 472 (1977), that in systems of silicone oil and hydrophobic silica particles the real foam breakers are the silica particles. They reason that the silicone oil brings the particles to the interface between the air and bubble film by spreading them over the film surface. The silica particles adsorb surfactant, resulting in local depletion of surfactant at the bubble surface, causing bubble shock and instability. On the other hand, P. R. Garrett has proposed in J. Colloid and Interface Science 1980, 76, 587 that silicone oil is the real foam breaker; the silicone oil droplets bridge thin liquid foam films and are subsequently drawn apart by capillary forces to form a hole resulting in film rupture. Under this theory, the hydrophobic particles sit at the interface of oil and water (film), facilitating the formation of the oil bridges and, therefore, the rupture of foam films.

The presence of antifoam agents in laundry detergent compositions is particularly important under washing conditions wherein the surfactant concentration in washing machines is high such that the foam problem is severe, unless an antifoam agent is included in the formulation. A successful foam control will allow higher active (surfactant) content and freedom to choose surfactants in detergent formulation. Use of antifoams desirably results in products of better performance and lower cost. To achieve such results, one might attempt to switch from a hydrocarbon based-antifoam to a mixture of hydrocarbon and silicone antifoams. However, the antifoaming performance of such mixtures exceeds that of the pure hydrocarbon antifoams but is still below that of the silicone-based antifoams. The present invention pertains to an antifoam which offers performance comparable to the silicone antifoams with a cost comparable to a mixture of hydrocarbon and silicone.

It is known in the art from, e.g., Encyclopedia of Chemical Technology, Vol. 7, pp. 430–447 (1979) that inorganic fillers such as silica particles increase the antifoam efficiency. The use of hydrophilic silica such as precipitated and fumed silica in silicone-based antifoam is disclosed in U.S. Pat. Nos. 3,560,401, 4,076,648, and 4,101,443. The procedure used therein generally involves heating the silica particles and silicone oils together at 100° C. to 150° C. for several hours to complete the hydrophobization of the silica particles and to fluidize the mixture.

To avoid this time-consuming and cumbersome hydrophobing step, hydrophobic silica particles have been used. These are disclosed in U.S. Pat. No. 4,395,352 for silicone-based antifoams and in U.S. Pat. Nos. 3,076,768; 3,388,073 and 3,714,068 for hydrocarbon-based antifoams.

O'Hara et al., U.S. Pat. No. 3,560,403 discloses the use of certain reactive alkylaminosilicones to hydrophobe silicate particles in situ in a process for making antifoam compositions. The alkylaminosilicone compounds used therein are represented by the formula $(R_2N)_x(SiR_2O)_mSiR_2(R)_{2-x}$. An example is $(Me_2N)(SiMe_2O)_{20}SiMe_3$. A chemical reaction between the silicate silanols and the dialkylamino organosilicone fluid is said to take place releasing dimethylamine and resulting in a hydrophobic surface on the silicate particles. The reaction is said to take place without the necessity of heating and cooling cycles. The alkylaminosilicones of O'Hara et al. are quite different from those of the present invention; their nitrogen atoms attach directly to the silicon atom whereas the compounds of our invention have at least three carbon atoms separating the nitrogen and silicon atoms. The alkylaminosilicones of the present invention are not chemically reactive toward silanols. The antifoams are said to be useful in laundry and detergent products, among other applications.

Griswold et al., U.S. Pat. No. 4,584,125 discloses an antifoam composition including a non-aqueous liquid such as a diorganopolysiloxane or mineral oil, an amine-containing compound selected from an aminofunctional organopolysiloxane and/or an organic amine, and an inorganic filler. The amino-functional organopolysiloxane may be of the formula

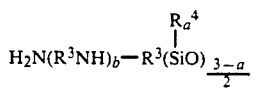

wherein $R^3$ may be a divalent hydrocarbon or hydrocarbonoxy radical. Tertiary amino organosilanes or siloxanes which have at least one ether linkage in the organic group connecting the tertiary amino group to the silicon atoms may also be used. It is said that the Griswold et al. antifoam can be prepared at room temperature and at atmospheric pressure. The compositions are said to be useful in laundry and detergent products.

Morehouse U.S. Pat. No. 3,032,577 discloses organosiloxanes which are said to be useful for a variety of applications in the synthetic polymer art, particularly as flocculating agents for aqueous dispersions of clay. The organosiloxanes of the Morehouse patent include units of the formula:

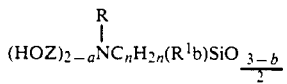

wherein —OZ— is the divalent group derived from a monoepoxide by opening of the oxirane ring, HO is interconnected to N through 2 carbon atoms, a is an integer from 0 to 1, n is an integer from 3 to 15, and R may be hydrogen, monovalent hydrocarbon or

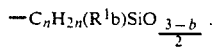

Z may be a hydrocarbon-substituted ethylene such as

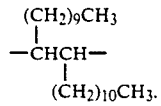

The Morehouse compounds are said also to be useful as complexing agents for removing metal ions, particularly cupric and ferric ions.

Kulkarni et al., U.S. Pat. No. 4,514,319 discloses antifoam compositions comprising a hydrocarbon-silicone copolymer in combination with a hydrocarbon carrier oil, an organosilicone surfactant, a hydrophobic filler and optionally a silicone oil. Although the composition is said to work as an efficient antifoam, it appears not to have self-hydrophobing properties in that it appears necessary to use hydrophobic silica particles or to heat the mixture with hydrophilic silica particles.

SUMMARY OF THE INVENTION

The present invention involves use in antifoams of a specific alkylaminosilicone which is soluble in mineral oils, thereby resulting in enhanced surface activity, and which imparts to antifoam compositions containing hydrophilic mineral particles self-hydrophobing properties. Certain mixtures of this alkylaminosilicone with surfactants, fillers such as silica particles, and hydrocarbon oils are effective antifoams for difficult-to-defoam surfactant solutions. Their performance is as effective as or better than the traditional all-silicone antifoams, but with the self hydrophobing benefit.

The compositions of the present invention provide the hydrocarbon-based antifoam which includes (1) the alkylaminosilicone defined below, (2) finely divided filler particles, (3) a hydrocarbon oil carrier, and optionally (4) o/w surfactants and (5) a silicone oil.

The alkylaminosilicones used in the antifoam formulations of the invention effectively reduce the surface tension of hydrocarbon oils, resulting in an enhanced spread of the oils over foam surfaces. As pointed out above, this spreading over the foam surfaces is a proposed mechanism for rupturing the foams. To deliver this benefit, the compounds must be soluble in the hydrocarbon oils and still possess excellent surface activity. We have discovered certain alkylaminosilicones with particular structural parameters which satisfy this requirement.

The silicones of this invention are produced by treating silicones containing primary or secondary amine functional groups with epoxides such as ethylene oxide. This reaction effectively converts most amines to tertiary amines with one or two beta-hydroxylhydrocarbyl substituents.

The alkylamino silicones included in the antifoam formulations of the invention comprise an organosiloxane including at least one unit of formula A:

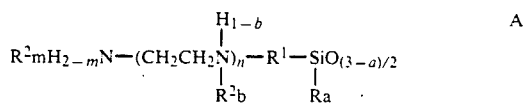

wherein
a is from 0 to 2, n is from 0 to 5, preferably from 1 to 5,
R is a monovalent radical,
$R^1$ is a divalent hydrocarbon radical,
$R^2$ is

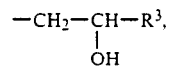

$R^3$ is a hydrocarbon radical having from 6 to 50 carbon atoms, preferably from 12 to 18 carbon atoms and may be saturated, unsaturated, cyclic, acyclic, alkyl or aromatic, m is 1 or 2, and b is 0 or 1.

R is preferably selected from the group consisting of hydrocarbon radicals, halogenated hydrocarbon radicals, hydrogen, hydroxyl, and alkyoxyl groups. Especially preferred are methyl, phenyl and -trifluoropropyl. R groups having from 1 to 10 and particularly 1 to 4 carbon atoms are preferred. The divalent hydrocarbon radical of $R^1$ preferably includes from 1 to 20 carbon atoms, more preferably 3 to 20 carbon atoms and even more preferably 3 to 5 carbon atoms. n is preferably 1; m is preferably 2; and b is preferably 1.

An example of the unit of formula A is:

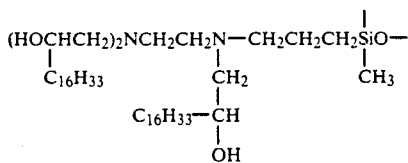

The units of Formula A are present in the organosiloxane with units of Formula B:

$$R^5{}_aR^4{}_cSiO_{(4-a-c)/2} \qquad \qquad B$$

wherein $R^4$ and $R^5$ are the same or different monovalent radicals, a and c are integers of 0, 1, 2 or 3 and a plus c is 1, 2 or 3. Preferably $R^4$ and $R^5$ are hydrocarbon radicals or halogenated hydrocarbons. Methyl, phenyl and -gammatrifluoropropyl are especially preferred for $R^4$ and $R^5$. Generally, $R^4$ and $R^5$ will include from 1 to 20 carbon atoms, preferably from 1 to 10 carbon atoms, more preferably from 1 to 4 carbon atoms. It is particularly preferred that a plus c equal 2.

Preferably, each of the "R" groups other than $R^3$ described above, e.g., R, $R^1$, $R^2$, etc. includes no greater than 20 carbon atoms, even more preferably no greater than 10 carbon atoms.

The modified alkylaminosilicones of the invention generally include at least 1 unit of Formula A, and at least one unit of Formula B, and may be in the form of random copolymers, block copolymers, cyclic polymers, linear polymers or branched polymers. The content of Formula A in the polymer ranges by number of repeat units between 0.5% and 100%, preferably between 1% and 10%, more preferably between 5 and 10%. The molecular weight of the modified alkylaminosilicone preferably ranges from 1000 to 1,000,000.

An example of the alkylaminosilicone used in the formulations of the invention is as follows:

respect to the particular hydrocarbon carrier used in the antifoam compositions, e.g., mineral oil.

A preferred embodiment of the invention comprises antifoam compositions including modified alkylaminosilicones at a % $CH_2$ content within defined ranges. The % $CH_2$ content is defined as $$\% \ CH_2 = \frac{\text{\# of methylene groups}}{\text{\# of methylene groups and methyl groups}}$$

As will be demonstrated in Example 4 below, alkylaminosilicones of specific $CH_2$ content are soluble in hydrocarbon mineral oil, and the resulting mixtures have a reduced surface tension and also spread on 0.5% by weight sodium dodecylsulfate solution. The preferred range of $CH_2$ content for the modified alkylaminosilicones is from about 45% to about 90%, more preferably from about 50% to 85%, and most preferably from 50% to 75%.

BRIEF DESCRIPTION OF THE DRAWINGS

FIG. 1 is a graph illustrating the effect on the surface tension of silicone/mineral oil mixtures of modified alkylaminosilicones according to the invention and of conventional silicones.

DETAILED DESCRIPTION OF THE INVENTION

The modified alkylaminosilicones of the invention may be prepared by mixing epoxide compounds with aminosilicones in a pressure reactor and heating for about 24 hours, after which the unreacted epoxide compound is vacuum stripped off. The amount of epoxide to be used is calculated based upon the number of amine functional groups on the alkylaminosilicone. Preferably, two epoxides are reacted for every primary amine and one epoxide for every secondary amine, in order to convert them to tertiary amines. A stoichiometric amount or up to 25% excess of epoxide can be used. The reaction is preferably conducted between 25° C. and 150° C., especially between 50° C. and 100° C. The

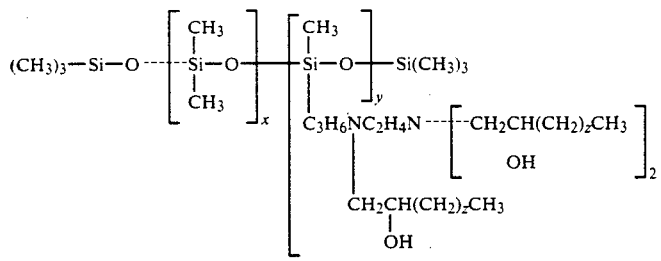

x = 500, y = 50 and z = 15

In order to perform successfully as antifoams, the modified alkylaminosilicones of the invention are strongly preferred to have a methylene content ($CH_2$ groups) sufficient to ensure solubility in a hydrocarbon (i.e., that in the antifoam) of at least 1% by weight, preferably at least 5–10%. Moreover, it is also strongly preferred that the aminoalkyl silicone exert a surface tension-lowering on the hydrocarbon oils of at least about 5 dynes/cm, even more preferably 6–10 dynes/cm. It is especially preferred that the modified alkylaminosilicones possess the aforementioned solubility and surface tension lowering characteristics with pressure is preferably maintained from 50 psi to 300 psi, particularly from 50 psi to 150 psi. Typical aminosilicone starting compounds would include Dow Corning Q2-8075.

A preferred class of modified alkylaminosilicones are the hydroxyalkyl-modified amodimethicones. Amodimethicones are polydimethylsiloxane polymers containing aminoalkyl groups. The aminoalkyl groups may be present either pendent or at one or more ends of the polydimethylsiloxane chain. Amodimethicones are commercially available and include Dow Corning Q2-8075 mentioned above.

The invention also comprises a method of making an antifoaming composition, which comprises mixing together hydrophilic inorganic particles, the modified alkylaminosilicones defined above and a hydrophobic oil until homogenized. The antifoam may then be diluted to the desired concentration.

The art of making these alkylaminosilicones is disclosed in Examples 1 and 2 herein and in the copending patent application of Lin et al. entitled "Hydroxylhydrocarbyl Modified Aminoalkyl Silicones", Ser. No. 276,726 filed Nov. 28, 1988, the disclosure of which is incorporated by reference herein.

The proportion of the alkylaminosilicone in the antifoam compositions is from 1% to 70%, preferably from 5% to 25%.

Filler Particles

The fillers of the invention may be hydrophilic inorganic particles, any of the hydrophobic particle in the prior art, or mixtures thereof. The proportion of the fillers in the antifoam composition is up to 20%, preferably from 0.1 to 20%, more preferably from 2% to 7%.

Examples of hydrophilic inorganic particles include silica, aluminum oxide, titanium oxide, talc, calcium carbonate, magnesium oxide, pearlite and clay. The preferred particle size is from $0.1\mu$ to $10\mu$. The natural surface of these particles is hydrophilic; however, they can be rendered hydrophobic. A single filler or mixture of fillers may be used.

Common methods for activating these particles such as that disclosed in U.S. Pat. No. 3,560,401 may be used. In the '401 patent, a basic catalyst such as potassium hydroxide in a small amount (about 0.1%) is added to a mixture of silica and silicone oils, followed by heating the mixture for a few hours at 100° C. to 150° C. Intrinsically hydrophobic particles are useful in the present formulations and include amides of long chain fatty acid alcohols as disclosed in GB Patent No. 1,386,042 and polyolefin polymers as disclosed in U.S. Pat. No. 3,705,859. While the modified alkylaminosilicones of the invention feature the advantage that they readily hydrophobe inert inorganic fillers thereby making compositions including the fillers self-hydrophobing (e.g., no heat is required), it is not necessary that the fillers of the invention be hydrophilic or that they all be hydrophilic.

Hydrocarbon Carrier Oil

A broad range of water immiscible fluids can be used as the carrier. These include, but are not limited to, vegetable oils and normally liquid hydrocarbons. Vegetable oils are generally derived from plant seeds and are mixtures of glycerides, for example, castor oils, palm oils, and olive oils. The normally liquid hydrocarbons include tetradecane, isooctane, hexadecane, mineral oils, and kerosene. The liquid oils may contain a viscosity modifier such as polyisobutylene. Another useful class of carrier fluid is petrolatum, mineral jelly, petroleum jelly and the like. Preferred materials from this class have melting points in the range of about 38° C. to about 60° C. Carriers and other antifoam components are set forth in Carter U.S. Pat. Nos. 4,465,613 and 4,362,642 which are incorporated by reference herein. The carriers are preferably present in the antifoam formulations of the invention at from about 80 to 97 wt. %, preferably 85 to 95%.

Hydophilic Surfactants

Hydrophilic surfactants are optional ingredients. U.S. Pat. No. 4,076,648 discloses the addition of hydrophilic surfactants in antifoams to improve the dispersability in water and the spreading over foams. The Hydophilic surfactants have a hydrophilic-lipophilic balance (HLB) over 5, preferably over 10. Examples are the nonionic surfactants such as sorbitan oleate, ethoxylated nonylphenyl and ethoxylated stearyl alcohol. Another class of the hydrophilic surfactants is comprised of copolymers of silicone and polyalkylene oxide. Examples are Silwet copolymers available from Union Carbide. The proportion of the hydrophilic surfactants in the antifoam composition is up to 20%, preferably from 0.1% to 20%, most preferably 0.5% to 7%. Example 4 below demonstrates that a mixture of 20% of the modified alkylaminosilicones of the present invention in mineral oils without the hydrophilic surfactants spreads over a sodium dodecylsulfate (SDS) solution surface, whereas the hydrocarbonsilicone copolymers of the prior art U.S. Pat. No. 4,514,319 does not. This is a significant improvement.

Silicone Oils

The silicone oil is an optional component. Any silicone oil can be used to replace part of the modified alkylaminosilicone of the invention. The proportion in the antifoam composition is up to about 20%, preferably 0.5% to 20%.

Among the uses for the antifoam compositions of the invention are inclusion in laundry detergent, automatic dishwashing detergent and other household fabric treating and cleaning formulations. Generally, the antifoam ingredients will be included in laundry and other formulations in the proportions with respect to each other given above. Usually the ratio by weight of alkylaminosilicone to filler to hydrocarbon carrier oil (calculated with the alkylaminosilicone set to 1) will range from about 1:1:100 to about 1:0.5:2, preferably from 1:0.4:19 to 1:0.4:9.

The present invention includes laundry detergent, automatic dishwashing detergent and other formulations including the antifoam compositions herein. Additional ingredients typically found in laundry detergent and automatic dishwashing detergent formulations are disclosed in U.S. Pat. Nos. 4,404,115 (liquid laundry detergent), 4,692,275 (powdered laundry detergents) and 4,464,281 (powdered autodish products), which are hereby incorporated by reference herein. In general, the detergent products include about 2 to about 30% of surfactants selected from a group including anionic, nonionic, cationic, amphotenic and zwitterionic surfactants and mixtures thereof, 0 to 40%, preferably 0.5 to 40% of a detergent builder, from 0.1 to about 3% of the present silicone/hydrocarbon antifoam compositions and optionally other ingredients commonly found in such formulations.

Builders include alkali metal and ammonium phosphates, carbonates, citrates and other polycrboxylates, crystalline aluminosilicates, amorphous aluminosilicates, carboxylate polymers and mixtures thereof. Preferably the builders are present at from 0.5 to about 40% by weight.

The anti-foam compositions of the present invention can be used in a self dispersible form or can be pre-emulsified by any of the standard techniques well known in the art (e.g., U.S. Pat. No. 4,514,319).

For certain applications, it is useful to incorporate the anti-foam in some form of solid granule or adjunct. This may involve granulation or spraying of the antifoam composition onto a sufficiently porous support. Such technology is well known in the art and can be applied to the present compositions.

Antifoam Efficiency Measurement

Antifoam efficiency may be defined as a function of the foaming rate of a detergent solution with and without antifoam at a constant aeration rate. Generally, the foaming rate of a solution is decreased by the addition of antifoam. However, the relationship of foam volume vs. time remains linear. Therefore, efficiency (E) is represented at a constant aeration rate as: $E = Ko/K$ wherein E is efficiency, Ko is the slope of foam volume vs. time for a detergent solution without antifoam, and K is the slope of foam volume vs. time for a detergent solution with antifoam. Therefore, an efficiency of 1 indicates the absence of antifoam or the inability of a material to defoam. An efficiency of 10 means a ten-fold increase in the time required to generate a given volume of foam.

The standard procedure for the determination of antifoam efficiency is used herein. The antifoam compound is added either neat or predissolved in methylethylketone to 50 ml of the detergent solution. The mixture is agitated by shaking for 15 seconds and added to a one liter graduate containing 200 ml of the same detergent solution for a total solution volume of approximately 250 ml. A fritted gas dispersion tube (coarse) is added to bubble nitrogen through the solution. The flow rate of the nitrogen should be such as to provide foam to fill a one liter graduated cylinder in 2.5 minutes. It is critical that the flow rate be kept constant since the results are compared to the slope (foam volume vs. time) of the control (detergent w/o antifoam). The foam volume is recorded at one minute intervals for 10 minutes. The results are then plotted in foam volume vs. time.

Special attention must be given to cleaning the glassware used in antifoam efficiency determinations. Glass frits are cleaned in acid alcohol followed by generous amounts of distilled water. The frits are also cleaned with isopropyl alcohol and a distilled water rinse between runs. The graduated cylinders are cleaned in an isopropanol/KOH solution and then followed by a distilled water rinse.

EXAMPLES

The following examples illustrate the synthesis, properties and performance of the modified alkylaminosilicone antifoam additives of the instant invention anti-foam compositions incorporating these ingredients and detergent formulations in which they may be useful. As stated above, the key features of these compounds are believed to be their ability to: 1) dissolve to some extent in and lower the surface tension of hydrocarbon oils, and 2) activate hydrophilic mineral fillers such as silica by adsorption on the mineral surface to render it hydrophobic. It is not necessary to add heat to the formulation to effect the hydrophobing of the mineral fillers.

Examples 1-3 describe the synthesis of selected compounds. Example 4 summarizes the materials prepared and their properties. This example will illustrate the importance of % alkyl substitution on hydrocarbon oil solubility. Example 5 demonstrates the ability of the instant modified alkylaminosilicone compounds to lower dramatically the surface tension of hydrocarbon oils. Examples 7-9 illustrate the ability of the instant alkylaminosilicones to modify and potentiate a mineral filler without the need for special and costly chemical treatment. Example 10 illustrates compositions incorporating the alkylaminosilicone additives and demonstrates that their performance is on a par or better than commercial silicone antifoams.

Example 6 demonstrates the self-hydrophobing property of the modified alkylaminosilicones of this invention. A simple mixing of hydrophilic silica and the modified alkylaminosilicones at room temperature activated the silica. Example 10 shows that there was no significant difference in antifoam efficiency between the heat-treated antifoam and the untreated antifoam. Furthermore, Example 9 demonstrates that the antifoam compositions of the invention are on a par or better than the commercially available all-silicone antifoams, even though no heat treatment was involved. Examples 11 and 12 illustrate typical powder and liquid detergent compositions in which the antifoams of the current invention may be useful while Example 13 demonstrates their efficacy in defoaming of such formulations.

Example 1 & 2

N-(2-aminoethyl)-3-aminopropylmethylsilicone-based structures

Preparation

EXAMPLE 1

The alkylaminosilicone $MD_{190}D^*_{10}M$ (Where $M = Me_3Si_{0.5}$, $D = Me_2Si\text{-}O$ and

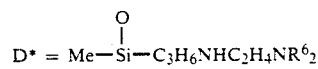

and

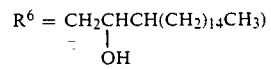

is a condensation product of the parent aminosilicone (where $R^6 = H$) and 1,2 epoxyoctadecane. The compound is prepared by placing the aminosilicone (61.16 g), 1,2-epoxyoctadecane (38.84 g) and 2-propanol (60.0 g) in a reaction vessel and heating to 80° C. for 24 hours. The reaction vessel consists of a three neck round bottom flask containing a stirrer, a reflux condenser and a thermometer. The 2-propanol is then stripped off with a $N_2$ sparge at 100° C. as described in the Lin et al. application mentioned above.

EXAMPLE 2

A "T" structure modified alkylaminosilicone is prepared according to Example 1 except that the silicone is $MD_{10.4}T^*M_2$. The alkylaminosilicones are of the nominal structure:

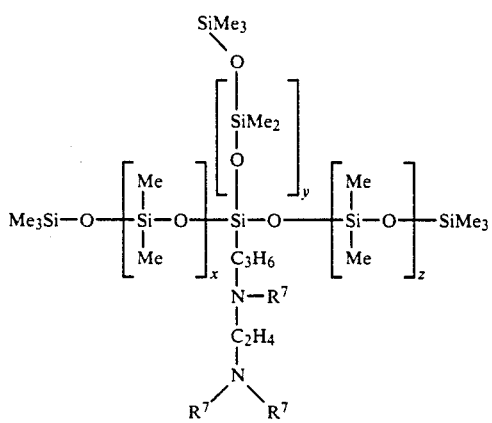

In the starting aminoalkylsilicone, $R^7=H$ whereas in the modified aminoalkylsilicone, $R^7=CH_2CHOH—(CH_2)_9CH_3$ In the process, 34.7 g aminoalkylsilicone, 34.4 g 1,2-epoxydodecane and 17.4 g 2-propanol were charged to the reaction vessel following the procedures of Example 1.

EXAMPLE 3

Preparation of 3-aminopropylmethylsiloxane-based structures

The procedure is similar to that of Examples 1 and 2 except that the silicone is

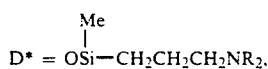

Where:

$$D^* = \overset{\text{Me}}{\underset{|}{O}}Si—CH_2CH_2CH_2NR_2.$$

$R=H$, for the parent aminosilicone
and $R=—CH^2—CHOH(—CH^2)_{15}CH^3$, for the modified alkylaminosilicone Therefore, 45.5 g of alkylaminosilicone, 21.5 g 1,2-epoxyoctadecane and 60.0 g 2-propanol were charged to the reaction vessel, following the procedures of Example 1.

EXAMPLE 4

Alkylaminosilicones and their properties

Table 1 lists the compounds prepared by methods analogous to those used in Examples 1-3 above. The nomenclature employed to represent their structure is:

$M = Me_3SiO_{0.5}$ $D = Me_2SiO$ $$D^* = \overset{R}{\underset{|}{Me}}SiO$$

$T^* = O_{3/2}Si-R$ (Cx) = length of alkyl chain in the starting epoxide

Thus, $MD_{92}D^*M(C8)$ represents an alkylaminosilicone of the following structure:

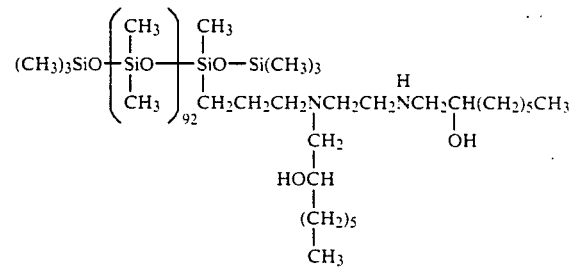

Unless otherwise indicated, in the following examples, compounds denoted by MDD*T* (Cx) notation corresponding to formulas in Table 1 have the same overall structure as the compounds of Table 1.

TABLE 1

| FORMULA # | STRUCTURE | D* or T* | R-ALKYL[1] | % CH₂ |
|---|---|---|---|---|
| AF1 | $MD_{92}D^*_8M$ | Me<br>OSi—C₃H₆NC₂H₄NR₂ | C8 | 39.77 |
| AF2 | $MD_{74.1}D^*_{3.73}M$ | Me<br>OSi—C₃H₆N—R₂ | C18 | 44.68 |
| AF3 | $MD_{10.4}T^*M_2$ | O₃/₂Si—C₃H₆NC₂H₄NR₂<br>R | C12 | 52.40 |
| AF4 | $MD_{190}D^*_{10}M$ | Me<br>OSi—C₃H₆NC₂H₄NR₂<br>R | C18 | 56.62 |
| AF5 | $MD_{92}D^*_8M$ | " | C12 | 57.61 |
| AF6 | $MD_{70.8}D^*_{9.6}M$ | " | C18 | 75.31 |
| AF7 | $D_3D^*$ | " | C18 | 92.98 |
| AF8 | $M_3T^*$ | O₃/₂Si—C₃H₆NR₂ | C8 | 57.69 |

[1] $R = —CH_2CH(CH_2)_n—CH_3$
          |
          OH

Table 2 summarizes the properties of the compounds of Table 1 that are relevant to their performance as antifoam additives. These are their ability to dissolve in mineral oil (20 wt %) and enhance its surface activity so as to cause spreading on a surfactant solution and to self-hydrophobe spontaneously a silica filler. The mineral oil used is a commercially available material marketed by Witco under the trade name "Gloria".

Several important points concerning the instant invention are evident in Table 2. First, it can be seen that the solubility is strongly influenced by the % $CH_2$ and a value above 45 is required for solubility in the mineral oil tested. While the minimum % $CH_2$ may vary depending upon the particular hydrocarbon oil used, these values can be easily determined by those skilled in the art.

Table 2 also compares the properties of alkylaminosilicones with an antifoam additive disclosed by Kulkarni et al. (U.S. Pat. No. 4,514,319). This latter material is the hydrocarbon silicone copolymer formed by the reaction of a silicone having Si functionality with C12 alpha olefin. The compound (AF11-$MD_{190}D^*_{44.4}M$) was prepared following the procedures disclosed in the art.

It is clear that the instant compounds represent a substantial improvement over those of the prior art. They not only dissolve the mineral oil but undergo more effective spreading on surfactant solutions in the hydrocarbon oil used here. It is likely that the polar character of the amino and hydroxyl groups produce a lower water/oil interfacial tension which promotes more effective spreading.

More importantly, as seen from Table 2, both hydrocarbon silicone copolymers (AF11) and simple polydimethylsiloxane oil (AF10) are unable to self-hydrophobe silica without extensive treatment (see below). As will be shown in further examples this property coupled with their ability to potentiate spreading is important to the high antifoam performance of the alkylaminosilicone compounds utilized in the invention.

As expected, mineral oil alone does not spread or self-hydrophobe silica and simple silicone oils do not dissolve in mineral oil.

due to their ability to reduce the surface tension of the hydrocarbon oils.

The present example illustrates the reduction in the surface tension of a hydrocarbon oil which is effected by the addition of the modified alkylamino silicone. The results using Witco "Gloria" mineral oil are given in Table 3 and shown graphically in FIG. 1.

It is clear that only low levels of our modified alkylaminosilicone (around 5 wt %) of the correct structure are required to reduce the surface tension to the value characteristic of silicone oil. Moreover, the effectiveness of these materials are on a par if not better than the hydrocarbon silicones disclosed in the prior art.

TABLE 3

Influence of Alkylaminosilicone on Surface Tension (Dynes/cm) of Mineral Oil

| | AF-3 | AF-8 | AF-11 |
|---|---|---|---|
| | | MODIFIED SILICONE | |
| (% BY WT.) | $MD_{10.4}T^*M_2$ (C12) | $M_3T^*$ (C8) | $MD_{190}D^*_{44.4}M$ CD12 CONVENTIONAL |
| 0 | 31.1 | 31.1 | 31.1 |
| 5 | 22.4 | 22.5 | 23.2 |
| 10 | 22.3 | — | 23.3 |
| 15 | 22.2 | — | 22.9 |
| 20 | 22.4 | 22.8 | 22.9 |
| 100 | 22.4 | 22.6 | 22.7 |

EXAMPLE 6

Self-hydrophobing Properties of Modified Alkylaminosilicones

Viscosity of Silica Dispersions in Mineral Oil

It is well known that when hydrophilic silica is dispersed in oils, the resulting dispersion is an extremely viscous gel. This arises because silanol groups on the surface of the silica link together by hydrogen bonds to form a rigid network. However, when the surface reacts with agents that render it hydrophobic, the viscos-

TABLE 2

Properties of Additives Relevant to Antifoam Performance

| COMPOUND # | SILICONE | Spreads on[1] 0.5 Wt. % SDS | Soluble in[1] Mineral Oil | Self-Hydrophobes[4] Hydrophilic Silica | % $CH_2$ |
|---|---|---|---|---|---|
| AF1 | $MD_{92}D^*_8M(C8)$ | Yes | No | No[5] | 39.77 |
| AF2 | $MD_{74.1}D^*_{3.73}M(C18)$ | Yes | No | Yes | 44.68 |
| AF3 | $MD_{10.4}T^*M_2(C12)$ | Yes | Yes | Yes | 52.40 |
| AF4 | $MD_{190}D^*_{10}M(C18)$ | Yes | Yes | Yes | 56.62 |
| AF5 | $MD_{92}D^*_8M(12)$ | Yes | Yes | Yes | 57.61 |
| AF6 | $MD_{70.8}D^*_{9.6}M(C18)$ | Yes | Yes | Yes | 75.31 |
| AF7 | $D_3D^*(C18)$ | Yes | Yes | — | 92.98 |
| AF8 | $M_3T^*(C8)$ | Yes | Yes | Yes | 57.69 |
| AF9 | Mineral Oil | No | — | No | |
| AF10 | Polydimethylsiloxane | Yes | No | No | — |
| AF11 | $MD_{190}D^*_{44.4}M(C12)$ | No | Yes | No | 50.71 |

[1]20 wt % silicone in mineral oil.
[2]Solubility at 50° C.
[3]Spreading is determined by placing a drop of oil on the surface of a 0.5 wt % SDS solution.
[4]There are two criteria that must be met to be self-hydrophobic:
a. A premix prepared according to Example 6 must remain pourable after homogenization.
b. The antifoam compound prepared according to Example 7 must be an active antifoam.
[5]The silicone self-hydrophobes the silica only when used neat. The addition of mineral oil dilutes the amine function below a useful level.

EXAMPLE 5

Ability of Additives to Lower Surface Tension of Hydrocarbon Oils.

As shown in Example 4, our modified alkylaminosilicones potentiate the spreading on foaming solutions such as sodium dodecyl sulfate of hydrocarbon oils in which they are dissolved. This property is in large part ity decreases dramatically because these cross-linking silanol sites are blocked. Thus, the viscosity of a filler is an excellent indication of whether it is hydrophobic and potent as an antifoam.

The following example illustrates that alkylaminosilicones are indeed capable of self-hydrophobing, that is, hydrophobing without the need for heat treatments or addition of additives.

A series of dispersions of hydrophilic silica were prepared in a mixture of antifoam additive and mineral oil (Witco "Gloria" brand). These dispersions had the following composition:

| Composition of Dispersion | |
|---|---|
| Cabosil HS-5 hydrophilic silica | 9.1% |
| Mineral Oil (Witco "Gloria") | 45.45% |
| Antifoam Additive | 45.5% |

The silica was first incorporated by slow stirring and then homogenized by means of a high shear mixer for about five minutes or until uniform. The viscosity of the dispersion was measured both before and after the homogenization step. The composition was chosen as a convenient premix for antifoams for work described in later examples. Similar results were obtained at other ingredient ratios. The viscosities of the resulting dispersions for a variety of additives are given in Table 4.

Generally, once the hydrophilic silica is added to the hydrocarbon carrier oil, the viscosity increases dramatically and the dispersion becomes a paste at silica levels more than a few weight percent. However, for the modified alkylaminosilicones of this invention no further treatment is required and the dispersions are fluid and stable as can be seen from Table 4. Dispersions formed in the presence of either simple polydimethylsiloxane or alkyl silicones form rigid gels, i.e., neither material is capable of hydrophobing silica.

EXAMPLE 7

Preparation of Hydrocarbon-based Antifoam Compositions

The compositions identified in Table 5 were prepared as follows:

Step 1. A premix comprising 9.1 wt % Cabosil HS-5, 45.45 wt % mineral oil, and 45.45% additive (e.g., alkylaminosilicone) was first prepared using the procedure set forth in Example 6.

Step 2. 1 part of the premix prepared in Step 1 was combined with 1.22 parts of mineral oil (Witco) and 0.06 parts of a silicone glycol surfactant sold by Union Carbide Corporation under the trade name Silwet L-7500. The formula was mixed with a spatula until homogeneous.

TABLE 5

Antifoam Compositions

| Formula # | Antifoam | Silicone | Wt. % Silicone | Mineral Oil | Wt. % Silica | Silwet L-7500 |
|---|---|---|---|---|---|---|
| CF1 | AF1 | $MD_{92}D^*_8M(C8)$ | 20.0 | 73.5 | 4.0 | 2.5 |
| CF2 | AF2 | $MD_{74.1}D^*_{3.73}M(C18)$ | 93.5 | 0.0 | 4.0 | 2.5 |
| CF3 | AF3 | $MD_{10.4}T^*M_2(C12)$ | 20.0 | 73.5 | 4.0 | 2.5 |
| CF4 | AF4 | $MD_{190}D^*_{10}M(C18)$ | 20.0 | 73.5 | 4.0 | 2.5 |
| CF5 | AF5 | $MD_{92}D^*_8M(C12)$ | 20.0 | 73.5 | 4.0 | 2.5 |
| CF6 | AF6 | $MD_{70.8}D^*_{9.6}M(C18)$ | 20.0 | 73.5 | 4.0 | 2.5 |
| CF7 | AF7 | $D_3D^*(C18)$ | 28.1 | 65.4 | 4.0 | 2.5 |
| CF8 | AF8 | $M_3T^*(C8)$ | 20.0 | 73.5 | 4.0 | 2.5 |
| CF9 | AF9 | — | — | 93.5 | 4.0 | 2.5 |
| CF10 | AF10 | Polydimethylsiloxane (200 cps) | 93.5 | — | 4.0 | 2.5 |

All the compositions employing alkylaminosilicones were smooth pourable liquids that were simple to prepare due to the self-hydrophobing properties of the additives of the invention. These compositions were evaluated for antifoam efficiency.

EXAMPLE 8

Performance of Antifoam Compositions

The antifoam compositions described in Example 7 were evaluated for efficiency. The results are collected in Table 6. For comparison, several commercial antifoams marketed by Union carbide and Dow Corning under the trade names of the SAG and DC series were also measured by the same technique. Several conclusions can be drawn.

First, it can be seen from Table 6 that all of the modified alkylaminosilicone additives are much more effective than either mineral oil (CF9) or simple polydimethylsiloxane (CF10) and most are much more effective than the hydrocarbonsilicone copolymer (CF11). This

TABLE 4

Influence of Additives on Viscosity of Silica Dispersions

| | SILICONE/MINERAL OIL/SILICA | | % CH$_2$ | Initial Viscosity CPS/25° C. | Final Viscosity CPS/25° C. |
|---|---|---|---|---|---|
| AF1 | $MD_{92}D^*_8M$ (C8) | (2) | 39.77 | 93,070 | 6,597 |
| AF3 | $MD_{10.4}T^*M_2$ (C12) | | 52.40 | 29,400 | 1,755 |
| AF4 | $MD_{190}D^*_{10}M$ (C18) | (1) | 56.62 | 10,602 | 2,145 |
| AF5 | $MD_{92}D^*_8M$ (12) | (2) | — | 139,800 | 22,500 |
| | MINERAL OIL | | — | GEL | GEL |
| | MINERAL OIL/200CS SILICONE | | — | GEL | GEL |
| AF11 | $MD_{190}D_{44.4}M$ (C12) CONVENTIONAL | | 50.71 | GEL | GEL |

Note:
1. The amino alkyl silicone was heated to 50° C. to effect rapid dissolution.
2. Silicone (91%) and silica (9%) only - no mineral oil.

is due to the self-hydrophobing characteristic of the modified alkylaminosilicone which potentiates the silica filler (See Example 6).

Table 6 also demonstrates that alkylaminosilicones which are soluble in mineral oil are generally more potent antifoams. Thus, antifoams CF3-7 have higher efficiency than antifoam CF1 (the alkylaminosilicone used in CF1 is not completely soluble in the hydrocarbon carrier; see Example 4). It is further seen that CF2 and CF8 are not as efficient as most of the other alkylaminosilicones. This may be due to either the shorter chain length alkyl group in the additive of CF8 or more likely the fact that the amino group in the additives of both compositions are monoamines, which makes performance of the alkylsilicone additive inferior to that obtained with analogous alkylaminosilicones (e.g., CF3 and CF5). Also, the % $CH_2$ for CF2 is less than the more preferred level of 50%.

It appears from the results in Table 6 that hydrocarbon oil-based antifoams in accordance with the present invention perform on a par with commercial silicone antifoams. (Compare C12-18 with CF2-7).

TABLE 6

Efficiency of Experimental and Commercial Antifoams

| | | | Efficiency 500 ppm | |
|---|---|---|---|---|
| Antifoam | Alkylaminosilicone | % $CH_2$ | 0.5 Wt % SDS | 0.5 Wt % Tergitol 15-S-9 |
| CF1 | $MD_{92}D^*_8M$ (C8) | 39.77 | 1.1 | — |
| CF2 | $MD_{74.1}D^*_{3.73}M$ (C18) | 44.68 | 3.7 | — |
| CF3 | $MD_{10.4}T^*M_2$ (C12) | 52.40 | 86.9 | 732.8 |
| CF4 | $MD_{190}D^*_{10}M$ (C18) | 56.62 | 13.2 | 366.4 |
| CF5 | $MD_{92}D^*_8M$ (C12) | 57.61 | 15.8 | 366.4 |
| CF6 | $MD_{70.8}D^*_{9.6}M$ (C18) | 75.3 | 5.4 | |
| CF7 | $D_3D^*$ (C18) | 92.8 | 18.0 | |
| CF8 | $M_3T^*$ ($C_8$) | 57.69 | 1.2 | |
| CF9 | (Mineral Oil) | 92.8 | 1.0 | |
| CF10 | Polydimethylsiloxane (200 cps) | — | 1.0 | |
| CF11 | $MD_{190}DI_{44.4}M$ (C12) (Conventional) | 50.71 | 1.2 | |
| CF12 | SAG 1000 + L-7500 | — | 116.4 | 192.5 |
| CF13 | SAG 47 + L-7500 | — | 4.7 | 732.8 |
| CF14 | SAG 42 + L-500 | — | 8.0 | 385.7 |
| CF15 | SAG 1000 | — | 4.2 | |
| CF16 | DB 100 | — | 1.2 | |
| CF17 | DC 1500 | — | 1.8 | |
| CF18 | DC 544 | — | 1.1 | |
| CF19 | $MD_{190}D^*_{10}M$ (C12 + 1, 2-Epoxydodecane) | 50.71 | 1.0 | |

Hyphens = Not tested

EXAMPLE 9

Self Hydrophobization vs. Heat Treatment

Example 9 illustrates the self-hydrophobing character of the compositions of the invention by comparing the antifoam efficiency of self- and heat-hydrophobed antifoam compounds. Compound AF5 was prepared as described in Example 7. Compound AF5H was prepared from the same alkylaminosilicone/mineral oil blend as AF5. However, in addition to applying shear the compound was heated to 150° C. for 3 hours. Both compounds were evaluated for antifoam efficiency at 500 ppm in 0.5 wt % SDS (Table 7, FIG. 2). Antifoam efficiency is found to be similar for both the self- and heat-hydrophobed compounds.

TABLE 7

Comparison of Self- and Heat-Hydrophobed Antifoam Compounds

| Formula # | Silicone | Efficiency 500 ppm | Viscosity[1] CPS/25° C. |
|---|---|---|---|
| AF5 | $MD_{92}D^*_8M$ (C12) (Self-Hydrophobed) | 15.6 | 5000 |
| AF5H | $MD_{92}D^*_8M$ (C12) | 20.9 | 1475 |

[1]Brookfield Viscometer

EXAMPLE 10

The Influence of Temperature on Efficiency

This example demonstrates the versatility of the instant invention. Depending on the structure, antifoam efficiency can be controlled by temperature. This feature is especially useful for processes where only part of the process requires antifoam efficiency at elevated temperature (i.e., 50° C.) and the rest of the process requires the antifoam to be dormant. Antifoams prepared with silicones containing a $C_{12}$ moiety or less decrease in efficiency as the temperature increases (AF3). Antifoam compounds prepared from silicones containing a C18 moiety, on the other hand increase in efficiency as the temperature increases. Table 8 clearly shows that $C_{18}$ modified alkylaminosilicone antifoams (AF2, AF4, AF6) outperform the shorter chain alkyl modified silicones, as well as the commercial silicone antifoams (AF15-18) at 50° C. Both mono and diamine adducts modified with $C_{18}$ show significant improvements in efficiency as the temperature is increased.

TABLE 8

The Effect of Temperature on Efficiency

| | | 0.5 WT % SDS Efficiency 500 ppm | |
|---|---|---|---|
| ID | Silicone | 25° C. | 50° C. |
| CF2 | [1]$MD_{74.1}D^*_{3.73}M$ (C18) | 3.7 | 1973.1 |
| CF3 | $MD_{10.4}T^*M_2$ (C12) | 86.9 | 29.2 |
| CF4 | $MD_{190}D^*_{10}M$ (C18) | 13.1 | 368.4 |
| CF6 | $MD_{70.8}D^*_{9.6}M$ (C18) | 5.4 | 462.0 |
| CF15 | SAG 1000 | 4.2 | 4.4 |
| CF18 | $DC_{544}$ | 1.1 | 3.1 |

[1]No mineral oil.

EXAMPLE 11

Representative Powder Detergent Compositions

The anti-foams of the present invention are useful for detergent applications. One such application is in controlling the foaming of laundry washing powdered detergents. Some representative prophetic compositions are illustrated in Table 9.

TABLE 9

Representative Powder Detergent Compositions

| Ingredients | A | B | C | D | E |
|---|---|---|---|---|---|
| Alkylaryl sulfonate ($C_{13}$) | 16 | 10 | 7 | 11 | 12 |
| Alcohol Ethoxylate (e.g., Neodol 45-13) | | | 2 | 4 | 5 |
| Alcohol Ethoxy Sulfate (e.g., Alfonic 1214 3EO sulfate) | | 7 | | | 2 |
| Tallow Alcohol sulfate | | | | | 2 |
| Anti-foam<br>15 Parts alkylaminosilicone<br>4 Parts silica<br>3 Parts silicone-copolyol<br>78 Parts hydrocarbon carrier | 0.4 | 0.7 | 1.0 | 1.0 | 0.7 |
| Sodium Stearate | 0.5 | | | 2 | |
| Sodium Tripolyphosphate | 30 | | 35 | | |
| Sodium Carbonate | | 10 | 3 | 5 | 30 |

TABLE 9-continued

| Representative Powder Detergent Compositions | | | | | |
|---|---|---|---|---|---|
| Ingredients | A | B | C | D | E |
| Aluminosilicate (e.g., Zeolite 4a) | | 25 | | 30 | |
| Sodium Silicate | 6 | 3 | 6 | 8 | 20 |
| Sodium Sulfate and water | | | to 100% | | |
| Enzymes (e.g., protease) | 1 | 0.8 | 0.5 | 1 | |
| Sodium Polycarboxylate | 1 | 0.5 | 5.0 | 4 | |
| Sodium Perborate (× 4H$_2$O) | | 12 | 12 | | |
| Bleach Activator (e.g., TAED) | | 3 | 3 | | |
| Fluorescer | 1 | 1 | 0.3 | 0.2 | 1 |
| Minors (perfume, colorants, etc.) | | | 1.5% | | |

EXAMPLE 12

Representative Liquid Detergent Compositions

The anti-foams of the present invention are also useful for applications in liquid laundry detergent compositions. Representative prophetic compositions are illustrated in Table 10.

TABLE 10

| Representative Liquid Detergent Compositions | | | | |
|---|---|---|---|---|
| | % in Formulation | | | |
| Ingredients | A | B | C | D |
| Sodium alkyl benzene sulfonate | 8 | 6 | 6 | 3 |
| C$_{12}$-C$_{13}$ alcohol ethoxylate (7 mole EO) | 2 | | 4 | 12 |
| Sodium ethoxy (3EO) sulfate | | 6 | | 2 |
| Sodium Triphosphate | 20 | | | |
| Sodium Citrate | | | | 10 |
| Trisodium Nitrilotriacetate | | 20 | | |
| Sodium Silicate | | 4 | | |
| Anti-foam compound | 0.5 | 0.5 | 0.4 | 0.2 |
| 20 parts alkylaminosilicone | | | | |
| 2 parts silicone co-polyol | | | | |
| 3 parts bis-stearamide | | | | |
| 75 parts hydrocarbon carrier | | | | |
| Fatty acids (C$_{12}$-C$_{18}$) | 2 | | 15 | 16 |
| Ethanol | | | | 10 |
| Sodium Xylene Sulfonate | | | | 5 |
| Enzymes (e.g., Alcalase) | 0.5 | | | 1 |
| Sodium Formate | | | | 2 |
| Sodium Tetraborate × 10 H$_2$O | 9 | | | |
| Glycerol | 5 | | | |
| Fluorescer | 0.2 | 0.4 | 0.2 | |
| Minors | 1 | 1 | 1 | 1 |
| Water | | Water to 100% | | |

EXAMPLE 13

Efficiency of Experimental Materials in Commerial Detergent Powder

The efficiency of the antifoam compound CF3 defined in Example 7 (Table 5 - MD$_{10.4}$T*M$_2$) was evaluated in anti-foaming a solution of a commercial laundry detergent, Surf Detergent ex Lever Brother Company. The antifoam concentration employed was 500 PPM while the detergent concentration was 6 gm/liter and the temperature of the solution was 50° C.

Duplicate measurements yielded efficiency values of 7.4 and 7.2 thus indicating that antifoams of the current invention are effective for typical laundry detergent products.

It should be understood that the specific forms of the invention herein illustrated and described are intended to be representative only. Changes, including but not limited to those suggested in this specification, may be made in the illustrated embodiments without departing from the teachings of the disclosure. Accordingly, reference should be made to the following appended claims in determining the scope of the invention.

We claim:

1. A composition which decreases foaming comprising:
   a) an alkylamino silicone having at least one unit of formula A

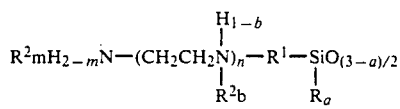

wherein a is from 0 to 2, n is from 0 to 5, R is a mono valent radical selected from the group consisting of hydrocarbon radicals, halogenated hydrocarbon radicals, hydrogen, hydroxyl, and alkoxyl groups, R$^1$ is a divalent hydrocarbon radical, R$^2$ is

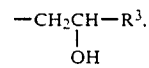

R$^3$ is a hydrocarbon radical having from 6 to 50 carbon atoms, m is 1 or 2 and b is 0 or 1,
   b) finely divided filler particles and
   c) a hydrocarbon carrier oil.

2. The antifoam of claim 1 wherein R is methyl, phenyl or trifluoropropyl.

3. The antifoam of claim 1 wherein R contains from 1 to 10 carbon atoms.

4. The antifoam of claim 1 wherein R contains from 1 to 4 carbon atoms.

5. The antifoam of claim 1 wherein R$^1$ contains from 1 to 20 carbon atoms.

6. The antifoam of claim 5 wherein R$^1$ contains from 3 to 20 carbon atoms.

7. The antifoam of claim 6 wherein R$^1$ contains from 5 to 20 carbon atoms.

8. The antifoam of claim 1 wherein R$^3$ contains 12 to 18 carbon atoms.

9. The antifoam of claim 1 wherein n is from 1 to 5.

10. The antifoam of claim 1 wherein n is 1, m is 2 and b is 1.

11. The antifoam of claim 1 wherein the alkylaminosilicone further comprises units of Formula B,

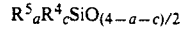      B wherein R$^4$ and R$^5$ are the same or different monovalent radicals, a and c are integers of 0, 1, 2 or 3 and a plus c is 1, 2, or 3.

12. The antifoam of claim 11 wherein R$^4$ and R$^5$ are independently selected from the group consisting of hydrocarbon radicals and halogenerated hydrocarbon radicals.

13. The antifoam of claim 11 wherein R$^4$ and R$^5$ contains from 1 to 20 carbon atoms.

14. The antifoam of claim 13 wherein R$^4$ and R$^5$ contains from 1 to 4 carbon atoms.

15. The antifoam of claim 11 wherein the units of Formula A comprise between 0.5% and 100% by number of repeat units in the alkylaminosilicone.

16. The antifoam of claim 11 wherein the units of Formula A comprise between 1% and 10% of the alkylaminosilicone by repeat unit.

17. The antifoam of claim 11 wherein the alkylaminosilicone has a molecular weight of from 1000 to 1,000,000.

18. The antifoam of claim 11 wherein the alkylaminosilicone has a solubility in the hydrocarbon carrier of at least 1% by weight.

19. The antifoam of claim 11 wherein the alkylaminosilicone has a solubility in the hydrocarbon carrier of at least 5% by weight.

20. The antifoam of claim 11 wherein the alkylaminosilicone in the antifoam exerts a surface tension lowering on the hydrocarbon of at least about 5 dynes/cm.

21. The antifoam of claim 11 wherein the % $CH_2$ content of the alkylaminosilicone is from about 45% to about 90%.

22. The antifoam of claim 21 wherein the % $CH_2$ content of the alkylaminosilicone is from about 50% to about 85%.

23. The antifoam or claim 22 wherein the % $CH_2$ content of the alkylaminosilicone is from about 50% to about 85%.

24. The antifoam composition of claim 11 wherein the filler comprises silica.

25. The antifoam of claim 11 wherein the hydrocarbon carries oil comprises mineral oil.

26. A composition comprising an effective amount for reducing foam formation of
a) an alkylaminosilicone having at least one unit of formula A

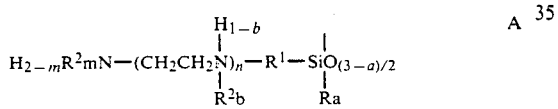

wherein a is from 0 to 2, n is from 0 to 5, R is a monovalent radical selected from the group consisting of hydrocarbon radicals, halogenated hydrocarbon radicals, hydrogen, hydroxyl, and alkoxyl groups, $R^1$ is a divalent hydrocarbon radical, $R^2$ is $$-CH_2CH-R^3,$$
$$\phantom{-CH_2CH-}|$$
$$\phantom{-CH_2CH}OH$$

$R^3$ is a hydrocarbon radical having from 6 to 50 carbon atoms, m is 1 or 2 and b is from 0 or 1,
b) finely divided filler particles and
c) a hydrocarbon carrier oil wherein the weight ratio of a:b:c is from 1:1:100 to 1:0.5:2.

27. The antifoam of claim 11 wherein the alkylaminosilicone $R^2$ groups contain 12 carbon atoms or less.

28. The antifoam of claim 11 wherein the alkylaminosilicone $R^2$ groups contain more than 12 carbon atoms.

29. A process of preparing an antifoam composition, which comprises mixing together hydrophilic inorganic particles, a hydrophobic oil and an alkylaminosilicone having at least one unit of formula A

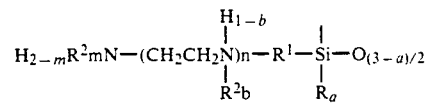

wherein a is from 0 to 2, n is from 0 to 5, R is a monovalent radical selected from the group consisting of hydrocarbon radicals, halogenated hydrocarbon radicals, hydrogen, hydroxyl, and alkoxyl groups, $R^1$ is a divalent hydrocarbon radical, $R^2$ is $$-CH_2CHR^3$$
$$\phantom{-CH_2CH}|$$
$$\phantom{-CH_2CH}OH$$

R3 is a hydrocarbon radical having from 6 to 30 carbon atoms, m is 1 or 2 and b is 0 to b 1.

30. The process of claim 29 wherein the hydrophobic oil is mineral oil.

31. The process of claim 29 wherein the hydrophilic inorganic particles are hydrophilic silica.

32. The process of claim 29 wherein n is from 1 to 5.

33. A detergent composition comprising:
a) from 2–30% by weight surfactants selected from the group consisting of anionic, nonionic, cationic, amphoteric, zwitterionic and mixtures thereof,
b) from 0 to 40% of a detergent builder
c) and from 0.1 to about 3% of an antifoam composition comprising:
i) an alkylamino silicone having at least one unit of formula A

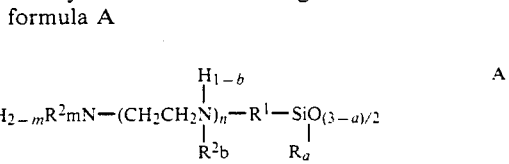

wherein a is from 0 to 2, n is from 0 to 5, R is a monovalent radical selected from the group consisting of hydrocarbon radicals, halogenated hydrocarbon radicals, hydrogen, hydroxyl, and alkoxyl groups, $R^1$ is a divalent hydrocarbon radical, $R^2$ is $$-CH_2CH-R^3,$$
$$\phantom{-CH_2CH-}|$$
$$\phantom{-CH_2CH}OH$$

$R^3$ is a hydrocarbon radical having from 6 to 50 carbon atoms, m is 1 or 2 and b is 0 or 1,
ii) finely divided filler particles and
iii) a hydrocarbon carrier oil.

34. The detergent composition of claim 33 wherein R is selected from the group consisting of hydrocarbon radicals, halogenated hydrocarbon radicals, hydrogen, hydoxyl and alkoxyl groups.

35. The detergent composition of claim 34 comprising from 0.5 to 40% of a builder selected from the group consisting of alkali metal and ammonium phosphates, carbonates, citrates, crystalline aluminosilicates, amorphous aluminosilicates and polycarboxylates.

36. The detergent composition of claim 34 wherein the weight ratio is from 1:0.4:19 to 1:0.4:9.

* * * * *